United States Patent
Maus et al.

(10) Patent No.: US 8,491,859 B2
(45) Date of Patent: Jul. 23, 2013

(54) DEVICE HAVING AN INJECTOR FOR A LIQUID REDUCING AGENT, CONFIGURATION HAVING THE DEVICE AND METHODS OF USING THE DEVICE AND THE CONFIGURATION

(75) Inventors: Wolfgang Maus, Bergisch Gladbach (DE); Ludwig Wieres, Overath (DE); Jan Hodgson, Troisdorf (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/548,422

(22) Filed: Jul. 13, 2012

(65) Prior Publication Data

US 2012/0308455 A1    Dec. 6, 2012

Related U.S. Application Data

(63) Continuation of application No. PCT/EP2011/050117, filed on Jan. 6, 2011.

(30) Foreign Application Priority Data

Jan. 13, 2010  (DE) .................. 10 2010 004 613

(51) Int. Cl.
*B01D 53/92* (2006.01)
*B05B 1/30* (2006.01)
*F01N 3/00* (2006.01)

(52) U.S. Cl.
USPC .................. 423/212; 239/533.1; 422/119

(58) Field of Classification Search
USPC .................. 423/212; 239/533.1; 422/119
See application file for complete search history.

(56) References Cited

U.S. PATENT DOCUMENTS

| 6,063,350 | A * | 5/2000 | Tarabulski et al. ......... 423/239.1 |
| 7,918,128 | B2 | 4/2011 | Kondo et al. |
| 2009/0020630 | A1 * | 1/2009 | Yan ...................... 239/533.1 |
| 2009/0248276 | A1 | 10/2009 | Kondo et al. |
| 2010/0050606 | A1 | 3/2010 | Fulks et al. |

FOREIGN PATENT DOCUMENTS

| EP | 1 925 354 A1 | 5/2008 |
| EP | 2 058 508 A1 | 5/2009 |
| EP | 2 105 607 A2 | 9/2009 |
| EP | 2 161 422 A2 | 3/2010 |

OTHER PUBLICATIONS

International Search Report of PCT/EP2011/050117, Apr. 2011.

* cited by examiner

*Primary Examiner* — Timothy Vanoy
(74) *Attorney, Agent, or Firm* — Laurence A. Greenberg; Werner H. Stemer; Ralph E. Locher

(57) ABSTRACT

A device includes an injector for a liquid having at least one pressure sensor, preferably an integrated pressure sensor. The device is used, in particular, for adding liquid reducing agent to an exhaust gas line of a motor vehicle. A configuration having the device and methods of using the device and the configuration are also provided.

9 Claims, 1 Drawing Sheet

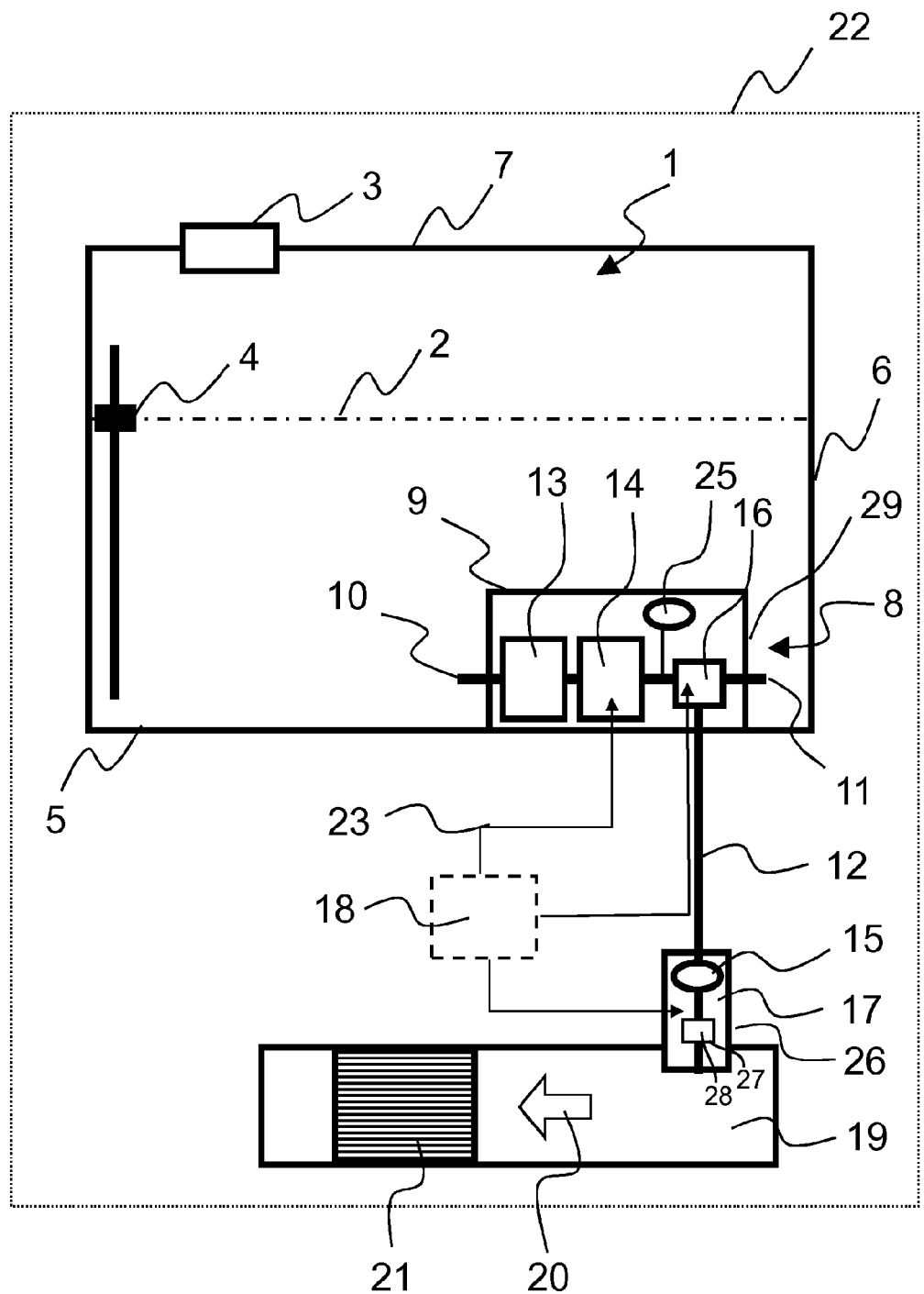

DEVICE HAVING AN INJECTOR FOR A LIQUID REDUCING AGENT, CONFIGURATION HAVING THE DEVICE AND METHODS OF USING THE DEVICE AND THE CONFIGURATION

CROSS-REFERENCE TO RELATED APPLICATION

This is a continuation, under 35 U.S.C. §120, of International Application No. PCT/EP2011/050117, filed Jan. 6, 2011, which designated the United States; this application also claims the priority, under 35 U.S.C. §119, of German Patent Application DE 10 2010 004 613.2, filed Jan. 13, 2010; the prior applications are herewith incorporated by reference in their entirety.

BACKGROUND OF THE INVENTION

Field of the Invention

The present invention relates to an injector for a liquid, in particular for adding liquid reducing agent to a mobile exhaust gas system of a motor vehicle. The present invention further relates to a configuration which has a tank having a tank bottom and which has a supply unit for a liquid, wherein the liquid, in particular, is a liquid reducing agent for exhaust gas after-treatment. The present invention also relates to methods of using the device and the configuration.

In order to remove nitrogen oxides ($NO_x$) in the exhaust gas flow of internal combustion engines, a liquid reducing agent is preferably injected into the exhaust gas flow so as to convert the nitrogen oxides contained in the exhaust gas flow into elemental nitrogen ($N_2$) and water ($H_2O$) through the use of a catalytic converter. An active substance, for example ammonia ($NH_3$) and/or urea ($CH_4N_2O$), is preferably dissolved in water and added as a liquid reducing agent. In order to store the liquid reducing agent, a tank is provided which cooperates with a supply unit so that the reducing agent can be conveyed from the tank to the exhaust gas flow.

A series of technical problems are encountered when conveying and storing the reducing agent in order to add a predetermined amount of the reducing agent to the exhaust gas flow under all operating conditions. In particular, those problems are based on the fact that the liquid reducing agent, in particular an aqueous urea solution, can freeze. In order to prevent the liquid reducing agent from freezing, anti-freeze agent can be added, for example, so that the freezing point of the aqueous urea solution, which normally lies at approximately −11° C., can be lowered to up to −40° C.

Even when using such an anti-freeze agent or freezing point reducer, it must nevertheless be ensured that the nitrogen oxides in the exhaust gas flow are reduced even at very low temperatures in the surrounding environment of the motor vehicle. For that purpose, it may be necessary to first thaw or melt the reducing agent. To that end, various methods for heating the tank and/or a sub-volume of the tank have already been proposed. However, not all of those methods are suitable for carrying out repeated thawing and freezing in such a way that liquid reducing agent can be reliably added to the exhaust gas flow.

Particular difficulties emerge if the liquid reducing agent is removed in the vicinity of the tank bottom and through the tank bottom. For example, it has been found in that case that the frozen reducing agent can indeed be thawed through the use of a heater at the tank bottom, but that areas of the frozen liquid disposed above cannot be reached and a thick covering of ice therefore remains around the removal point. The aspiration of the liquefied reducing agent leads, however, to a vacuum, against which the pumps used normally in that instance cannot function.

SUMMARY OF THE INVENTION

It is accordingly an object of the invention to provide a device having an injector for a liquid reducing agent, a configuration having the device and a method of using the device, which overcome the hereinafore-mentioned disadvantages and at least partly solve the highlighted problems of the heretofore-known devices, configurations and methods of this general type.

Another object is to specify measures which enable efficient removal of liquid reducing agent, either during the thawing process or shortly after the thawing process, so that substantially bubble-free conveyance in particular is enabled.

A further object of the invention is to propose measures with which more accurate knowledge of the extent of thawing and/or the fill level of liquid reducing agent during the thawing process and/or shortly after the thawing process is provided.

In addition, one objective is considered to be the specification of measures with which the supply unit and/or the injector can be monitored and/or controlled. The technical complexity is to be low, so that improved acquisition of measured values regarding state variables, in particular with regard to pressure, is to be achieved in the supply system where necessary.

With the foregoing and other objects in view there is provided, in accordance with the invention, a device, comprising an injector for a liquid, and at least one pressure sensor, preferably an integrated pressure sensor.

An "injector" is understood in particular to mean an adding device, which releases and closes/blocks a line portion for the liquid at predefined moments. In principle, it is indeed possible for such injectors to be constructed in a self-opening manner, that is to say the flow cross-section is released automatically with the presence of a predetermined pressure of the liquid upstream of the injector, although injectors which are electrically operated are used in many cases. Such an injector is formed in particular in the manner of an injection nozzle. Such an injection nozzle includes a needle valve where necessary, the needle of which is pressed onto a valve seat by biased springs in nozzle holders. A liquid pressure distributes in the pressure chamber, which lies above the nozzle opening, and opens the nozzle as a result of pressure against conical pressure shoulders of the nozzle needle disposed in the pressure chamber. The needle may also be lifted by a drive, in particular through the use of an electrically operated magnetic drive. In principle, such an injector may have a nozzle at the outlet, for example a pintle nozzle and/or a hole-type nozzle.

Whereas, until now, it was conventional to place a pressure sensor for establishing a pressure of the liquid either in the feed line to the injector or at a point of the line system between the pump and the injector, it is proposed in this instance for the pressure sensor to be integrated in the injector or connected releasably to the injector. In other words, this means that the pressure sensor is connected to liquid, which is already located in the injector and/or to components which cooperate in a pressure-sensitive manner with the liquid and are disposed in or on the injector. An embodiment in which the pressure sensor is connected to an inlet or connector of the injector on an injection line for feeding the liquid to the injector, is preferred. This may be carried out, in particular, in such a way that the pressure sensor is screwed onto the inlet or connector or is integrated therewith or therein.

In accordance with another feature of the invention, an embodiment in which the injector includes a needle valve having a pressure chamber and in which the pressure sensor is provided in fluid connection with the pressure chamber, is also preferred.

This allows the pressure at which the liquid of the injection is fed through the injector to be measured very precisely.

With this invention, a pressure sensor can be provided in a very space-saving manner. In addition, the electrical conductors or signal conductors or leads provided in part for operation of the injector can also be used to evaluate the pressure in the injector. A technically simple configuration is consequently also specified. In addition, it is to be taken into account that, in particular in order to monitor the entire supply unit, measurement of a state variable, such as pressure, in the vicinity of the outlet opening towards the exhaust gas system is advantageous so that particularly accurate measured values can be obtained.

In particular, a "liquid" is to be understood to mean a substance which has a liquid state of aggregation, at least at ambient temperature. The liquid is most preferably a reducing agent for the treatment of nitrogen oxides, which develop in the exhaust gas of internal combustion engines. For example, a liquid reducing agent is also understood to mean, besides ammonia, an ammonia precursor, such as urea. The liquid reducing agent may additionally contain a freezing-point-reducing substance as well as small particles, which do not impede conveyance. In this regard, "liquid" is a generic term, in particular for precisely these types of reducing agent.

In accordance with a further feature of the invention, it is also proposed for the at least one integrated pressure sensor to be disposed in a housing of the injector.

The pressure sensor is therefore most preferably enclosed or protected by the housing of the injector. It is thus also possible to protect the pressure sensor against the ambient conditions in the vicinity of the exhaust gas system, for example by appropriate seals, insulation, etc.

With the objects of the invention in view, there is also provided a configuration, comprising at least one tank having a tank bottom, a chamber disposed at the tank bottom, an injector configured to be positioned on an exhaust gas line for injecting a liquid into the exhaust gas line, and a supply unit disposed in the chamber and connected to the injector for supplying the liquid to the exhaust gas line, for providing at least one device according to the invention.

In principle, the tank can be formed by using metal and/or by using plastic. The tank generally has a complex geometry because it matches the environment or spatial conditions in the motor vehicle. The tank can be produced in one piece, but this is not absolutely necessary. A tank bottom, one or more tanks sides, and a tank cover can generally be assigned to the tank and together define the tank interior or the tank volume. Of course, it is also possible for the tank to be divided into a number of sub-volumes so that (different) amounts of liquid are stored in the different sub-volumes.

The configuration also has at least one supply unit, although precisely one (single) supply unit is generally provided. The supply unit includes components, with which the liquid can be conveyed out from the tank (passive components such as liquid-guiding lines, and active components such as apparatuses for treating, converting, heating the liquid, etc.). In this regard, the supply unit preferably includes at least one pump and corresponding supply lines for the liquid. Where necessary, it is possible for the supply unit to have even further components, such as at least one filter, at least one sensor and/or at least one valve. Electronic and/or electrical components may also be integrated in the supply unit, such as circuits, memories, processors, or the like.

The supply unit of the configuration according to the invention is disposed in a chamber at the tank bottom. The chamber, in particular, constitutes an inwardly directed curvature, indentation, recess, or the like from the adjacent tank bottom. Starting from the tank bottom, the chamber thus forms a chamber height. The chamber is free from the liquid which is stored in the tank and receives the supply unit, at least in part. The chamber can be an integral or separate connector part of the tank bottom. The chamber is also preferably closed, preferably at the level of the adjacent tank bottom. The chamber is also preferably disposed eccentrically or off-center, relative to the tank, that is to say it is disposed in the vicinity of a tank side.

In this instance, the chamber further preferably has at least one heater. The heater is most preferably operated with electrical energy. In principle, the heater can be formed separately, can be part of the supply unit, and/or can be disposed in or on a chamber wall.

The configuration proposed herein has a series of advantages. The chamber protruding into the tank allows a space-saving configuration of the supply unit. The proximity of the supply unit to the base also allows complete emptying of the tank in terms of the liquid, independently of the shape of the tank, for example as compared to tanks in which the liquid is removed through a supply unit disposed at the cover of the tank. In addition, the heater of the chamber protruding into the tank makes it possible, during thawing, for heat to be introduced deeper or further inside the ice. The heated surface is thus also increased locally. The preferred contour of the chamber with relatively steep chamber side walls (extending practically almost perpendicular to the tank bottom) also leads to the effect that thawed reducing agent flows in a targeted manner to a predetermined region of the tank bottom so that a large amount of the liquid can be thawed quickly there and can be transported to a removal point.

Although a preferred embodiment of the configuration has been described, the injector according to the invention having an integrated sensor can also cooperate with other configurations. In this case, sensors determining other or a plurality of state variables (pressure, temperature, conductance, etc.) at the same time can also be integrated where necessary.

The configuration is preferably constructed in the manner of a reducing agent supply device for motor vehicles having an internal combustion engine, wherein the exhaust gases are guided in an exhaust gas system, and reducing agent is delivered (in a controlled manner) into the exhaust gas system. The reducing agent supply device is integrated in the motor vehicle since the tank is fixed on the motor vehicle. The reducing agent supply device is equipped to guide reducing agent to the exhaust gas system as required, in particular with the use of a corresponding control unit.

Particularly with such a configuration, it is attempted to construct the supply unit so as to be very small, and therefore a smaller number of components in the chamber simultaneously increases the tank volume. In addition, it is to be taken into consideration, particularly with application in the field of passenger motor vehicles, that the injection line may be relatively long, for example longer than 3 m or even longer than 4 m. Therefore, in order to be able to provide specific and highly accurate statements with regard to the injection line and the pressure actually present at the injector, an embodiment of the injector according to the invention is considered to be particularly advantageous in this instance.

With the objects of the invention in view, there is concomitantly provided a method for delivering a liquid reducing agent. The method comprises adding the liquid reducing agent to an exhaust gas line of a motor vehicle with the device or the configuration according to the invention.

Other features which are considered as characteristic for the invention are set forth in the appended claims, noting that the features described individually in the claims can be combined with one another in any technically feasible manner and show further embodiments of the invention.

Although the invention is illustrated and described herein as embodied in a device having an injector for a liquid reducing agent, a configuration having the device and methods of using the device and the configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SINGLE VIEW OF THE DRAWING

The FIGURE of the drawing is a diagrammatic, lateral-sectional view of a motor vehicle having a device according to the invention.

DETAILED DESCRIPTION OF THE INVENTION

Referring now in detail to the single FIGURE of the drawing, there is seen a diagrammatic view of a motor vehicle 22 having a tank 1 for storing a liquid 2, in particular for storing liquid reducing agent, such as an aqueous urea solution. The tank 1 defines an interior with its delimiting walls, which are formed in this instance by an upper tank cover 7, a lower tank bottom 5 and tank sides 6 disposed therebetween. The tank 1 illustrated in this instance also has a filling opening 3 in the tank cover 7, through which the tank 1 can be filled with liquid 2 as required. It is also conventional for such a tank 1 to have one or more fill level indicators 4, with which the current fill level of the liquid 2 in the tank 1 can be determined.

A chamber 9, in which a supply unit 8 is disposed, is then provided off-center at the tank bottom 5. There is no liquid 2 in the chamber 9, but instead components for conveying the liquid 2 from the tank 1 to an injector 17 are disposed therein. The supply unit 8 removes liquid 2 from the interior of the tank 1 through an outlet 10, which is likewise disposed in the vicinity of the tank bottom 5. The supply unit 8 includes (in a circulation sequence indicated in this instance, starting from the outlet 10) firstly a filter 13, then a pump 14 and a valve 16, with which the liquid is conducted towards the injector 17. A temperature sensor 25 (or another sensor where necessary) may be provided in a line section between the pump 14 and the valve 16. The injector 17 also has a housing 26, in which a pressure sensor 15 is integrated or is formed in one piece with the housing. The injector 17 includes a needle valve 27 having a pressure chamber 28 and the at least one pressure sensor 15 is in fluid connection with the pressure chamber 28.

Alternatively to the routing of the liquid 2 to an injector 17, the valve 16 also enables conveyance to a return line 11, through which the liquid 2 is fed back to the tank 1 and consequently exits again from the chamber 9 into the tank.

A control unit 18 may be provided for operation of the pump 14, the valve 16, the injector 17 and/or further components. The control unit 18 is connected to the components by signal leads 23. The control unit 18 may additionally be connected to different sensors (for example to the integrated pressure sensor 15) and/or to superordinate control units (such as an engine control unit) so as to activate the conveyance or heating as required. The control unit 18 may likewise be integrated in the chamber 9. The liquid 2 conveyed by the supply unit 8 is fed through an injection line 12 and through an inlet, connector or attachment of the injector 17 to an exhaust gas line 19, through which exhaust gas flows in a predetermined direction of flow 20. The liquid 2 may be evaporated (for example by thermophoresis) or converted (for example by hydrolysis) to form a reducing agent for nitrogen oxides, where necessary with the aid of catalytically active substances. This mixture of reducing agent and exhaust gas can then be fed to an exhaust gas treatment unit 21, in particular a catalytic converter, so that the nitrogen oxides in the exhaust gas line 19 are reduced. The liquid 2 is preferably added while taking into consideration the amount of liquid 2 required in the exhaust gas line 19.

The invention claimed is:

1. A device, comprising:
   an injector for a liquid; and
   at least one pressure sensor integrated in said injector.

2. The device according to claim 1, wherein said injector has a housing and said at least one integrated pressure sensor is disposed in said housing.

3. The device according to claim 1, which further comprises an injection line for feeding the liquid to said injector, said injector having an inlet connected to said injection line.

4. The device according to claim 1, wherein said injector includes a needle valve having a pressure chamber, and said at least one pressure sensor is in fluid connection with said pressure chamber.

5. A device, comprising:
   an injector for a liquid; and
   at least one pressure sensor releasably connected to said injector.

6. A configuration, comprising:
   at least one tank having a tank bottom;
   a chamber disposed at said tank bottom;
   an injector configured to be positioned on an exhaust gas line for injecting a liquid into the exhaust gas line;
   at least one pressure sensor integrated in said injector; and
   a supply unit disposed in said chamber and connected to said injector for supplying the liquid to the exhaust gas line.

7. A method for delivering a liquid reducing agent, the method comprising the following steps:
   adding the liquid reducing agent to an exhaust gas line of a motor vehicle with the device according to claim 1.

8. A method for delivering a liquid reducing agent, the method comprising the following steps:
   adding the liquid reducing agent to an exhaust gas line of a motor vehicle with the configuration according to claim 6.

9. A configuration, comprising:
   at least one tank having a tank bottom;
   a chamber disposed at said tank bottom;
   an injector configured to be positioned on an exhaust gas line for injecting a liquid into the exhaust gas line;
   at least one pressure sensor releasably connected to said injector; and a supply unit disposed in said chamber and connected to said injector for supplying the liquid to the exhaust gas line.

* * * * *